UNITED STATES PATENT OFFICE.

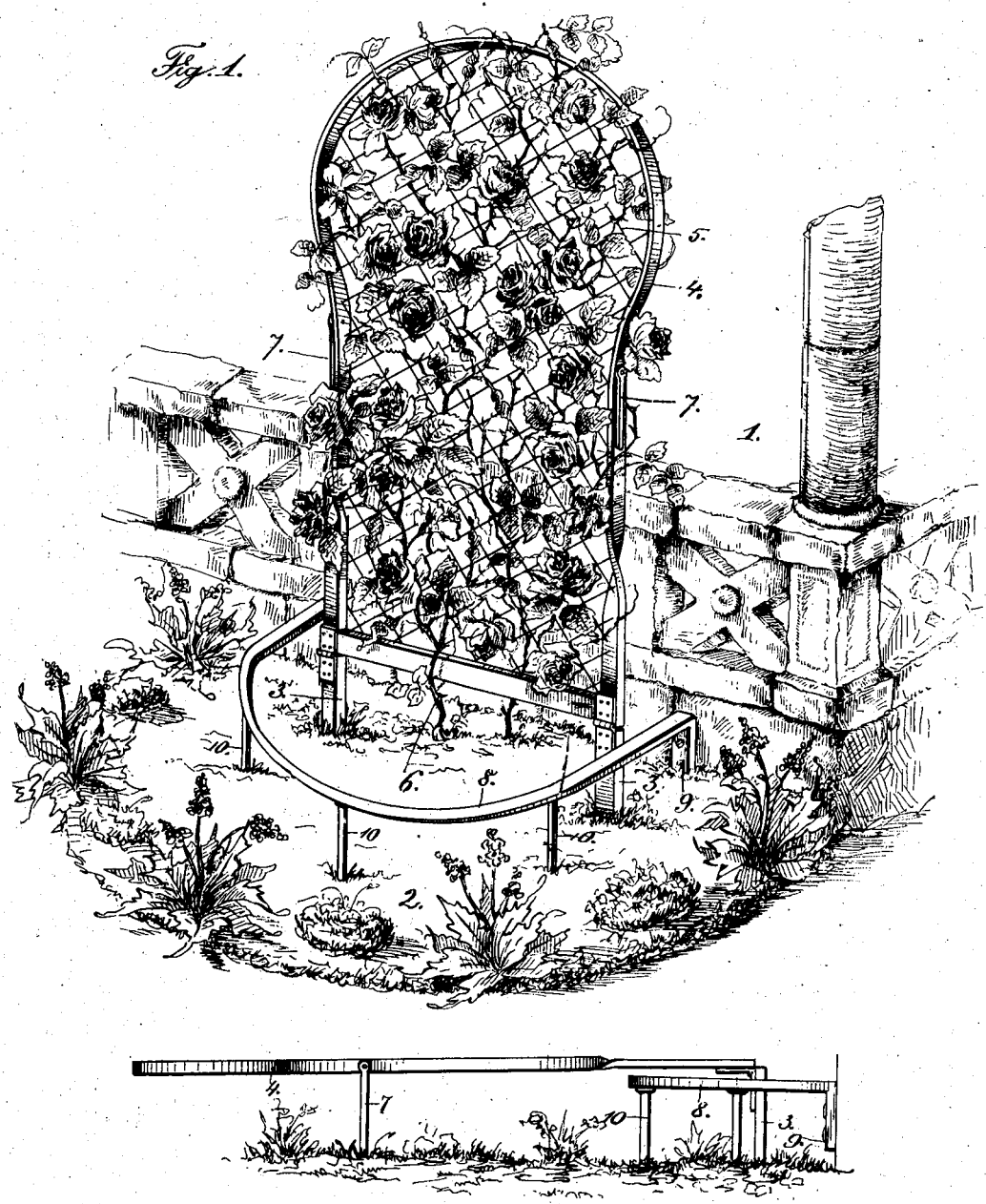

WALTER S. HOOD, OF WILKINSBURG, PENNSYLVANIA.

TRELLIS.

No. 834,672.   Specification of Letters Patent.   Patented Oct. 30, 1906.

Application filed May 22, 1906. Serial No. 318,171.

*To all whom it may concern:*

Be it known that I, WALTER S. HOOD, a citizen of the United States of America, residing at Wilkinsburg, in the county of Allegheny and State of Pennsylvania, have invented certain new and useful Improvements in Trellises, of which the following is a specification, reference being had therein to the accompanying drawings.

This invention relates to certain new and useful improvements in trellises for vines, flowers, and plants; and the object of this invention is to provide a simple and inexpensive trellis that can be temporarily folded or laid in a horizontal position without injuring the plant entwined in the trellis.

Another object of this invention is to provide a trellis having a novel form of watersprinkler for thoroughly moistening and cleaning the plant supported by the trellis.

To this end I have devised a trellis that can be located in close proximity to a building, porch, or similar structure and easily and quickly moved, whereby it will not prevent or interfere with the painting, cleaning, or repairing of said structure.

The detail construction of my improved trellis will be hereinafter more fully described and then specifically pointed out in the claim.

Referring to the drawings accompanying this specification, like numerals of reference designate corresponding parts throughout both the views, in which—

Figure 1 is a perspective view of my improved trellis. Fig. 2 is a side elevation of the same, showing the trellis folded or lying in a horizontal plane.

In the accompanying drawings I have illustrated a portion of a porch or veranda and a flower-bed 2 having my improved trellis mounted therein contiguous to the porch or veranda 1.

The trellis consists of two standards or posts 3, which are driven into the flower-bed, and hinged to said posts or standards is a frame 4, in which is arranged interwoven wire or lattice-work 5, adapted to support the vines 6 growing in close proximity to the frame 4 and the porch or veranda. The frame 4 is provided with pivoted supports 7 7, which lie in engagement with the frame 4 when the same is in a vertical position, but swing downwardly to support the frame in a horizontal position, as illustrated in Fig. 2 of the drawings.

Surrounding the posts or standards 3 is a guard-rail 8, having its ends secured to the porch or veranda, as at 9, and supported intermediate its ends by depending legs 10. The guard-rail prevents dogs and like animals from gnawing or destroying the plant or vines growing upon the trellis.

The frame 4, together with the vine growing thereon, is normally supported in a vertical position by the lower edges of the frame resting upon the tops of the supports or standards 3 3; but when it is desired to paint, cleanse, or repair the porch or veranda the trellis is lowered to a horizontal position, permitting of easy access being had to the balustrade of the porch or veranda.

The trellis is preferably constructed of metal and may be made of any size suitable for flower-beds or lawns.

What I claim, and desire to secure by Letters Patent, is—

A trellis comprising a pair of supporting-posts, an arc-shaped frame hinged at its lower end to said supporting-posts and having lattice-work, pivoted legs carried by the sides of said frame, and a guard-rail surrounding the frame, substantially as described.

In testimony whereof I affix my signature in the presence of two witnesses.

WALTER S. HOOD.

Witnesses:
K. H. BUTLER,
MAX H. SROLOVITZ.